(12) United States Patent
Counts

(10) Patent No.: US 11,045,032 B1
(45) Date of Patent: Jun. 29, 2021

(54) HOLLOW TUBE CARVING TOOL

(71) Applicant: Justin Alexander Counts, Grosse Pointe Park, MI (US)

(72) Inventor: Justin Alexander Counts, Grosse Pointe Park, MI (US)

( * ) Notice: Subject to any disclaimer, the term of this patent is extended or adjusted under 35 U.S.C. 154(b) by 0 days.

(21) Appl. No.: 16/864,846

(22) Filed: May 1, 2020

Related U.S. Application Data

(60) Provisional application No. 62/869,863, filed on Jul. 2, 2019.

(51) Int. Cl.
*A47J 25/00* (2006.01)
*B26B 11/00* (2006.01)
*A47J 43/25* (2006.01)

(52) U.S. Cl.
CPC ............ *A47J 25/00* (2013.01); *A47J 43/25* (2013.01); *B26B 11/006* (2013.01)

(58) Field of Classification Search
CPC .......... A47J 25/00; A47J 43/25; B26B 11/006
USPC ......................................... 30/165; 241/91–95
See application file for complete search history.

(56) References Cited

U.S. PATENT DOCUMENTS

| | | | | |
|---|---|---|---|---|
| 917,660 | A * | 4/1909 | Roberts | |
| 1,394,927 | A * | 10/1921 | Martin | B24D 15/08 76/84 |
| 3,861,087 | A * | 1/1975 | Martin | B24D 15/08 451/557 |
| 5,687,484 | A * | 11/1997 | Hahn | B23D 61/121 30/353 |
| 7,441,369 | B1 * | 10/2008 | McAtee | A01G 29/00 47/48.5 |
| 2006/0009141 | A1 * | 1/2006 | Smith | B24D 15/08 451/540 |
| 2014/0217215 | A1 * | 8/2014 | Smith | A47J 43/25 241/95 |

* cited by examiner

*Primary Examiner* — Phong H Nguyen

(57) ABSTRACT

A carving tool has a hollow tube having a first end and a second end and a surface, a conical tip on the second end, a handle connected to the first end, and a plurality of carving elements in the surface between the first end and the second end. In some embodiments, the carving elements are cutouts through the surface of the hollow tube, with sharpened edges on the perimeter of the cutouts. In other embodiments, the carving elements are grating or filling elements in the surface of the hollow tube.

4 Claims, 6 Drawing Sheets

DETAIL D
SCALE 4:1

HOLLOW TUBE CARVING TOOL

FIELD OF THE INVENTION

The present invention relates to a tool for designing, carving, grating, cutting and detail work on fruits, vegetables, or other medium to soft materials. As an example, for Halloween designing, carving, grating, cutting, and detail work on pumpkins or other gourds for display or presentation or food service in order to create smooth curved designs.

BACKGROUND OF THE INVENTION

A knife is conventionally used to carve Halloween pumpkins and other gourds. A knife is also conventionally used to design fruits and vegetables for display. A knife, however, can only cut in one direction at a time. A knife can change directions by application of force, but the carved portion is limited by the width of the knife and use of a knife can be dangerous based on the force needed to execute cuts. A need exists for a carving tool that can cut in any direction at any time and is capable of making smooth curved cuts, designs, or carvings in pumpkins and other gourds or in fruits and vegetables that presents a safer option. A need also exists for a carving tool that is maneuverable and capable of fine detail work. The present invention meets these needs.

SUMMARY OF THE INVENTION

The carving tool of the preferred embodiment of the present invention comprises a hollow tube having a first end and a second end and a surface, a conical tip on the second end, a handle connected to the first end, and a plurality of carving elements in the surface between the first end and the second end. In some embodiments, the carving elements are cutouts through the surface of the tube, the cutouts having sharpened edges on at least a portion of the perimeter of the cutouts. In some embodiments, the carving elements are grating elements.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

Figure 1:
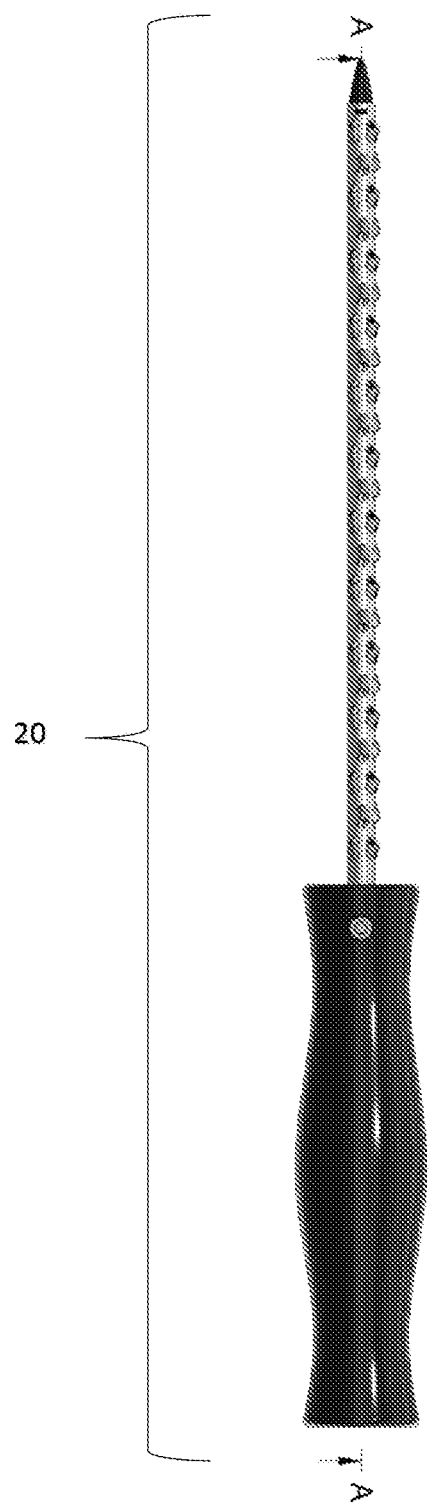
FIG. 1: ENTIRE TOOL is a plan view of the preferred embodiment of the carving tool of the present invention.

While the invention may be susceptible to embodiment in different forms, there is shown in the drawings, and herein will be described in detail, a specific embodiment with the understanding that the present disclosure is to be considered an exemplification of the principles of the invention and is not intended to limit the invention to that as illustrated and described herein. Therefore, unless otherwise noted, features disclosed herein may be combined to form additional combinations that were not otherwise shown for purposes of brevity.

FIG. 1 shows a preferred embodiment of a tool 20 which incorporates features of the present invention. Tool 20 has a hollow tube 22 having a first end 24 and a second end 26 and a surface 28, a conical tip 30 (which is preferably made from plastic, but can alternatively be made of aluminum, another metal, or other material) at second end 26, a plurality of multi-directional carving elements 32 through surface 28, and a handle 34 with a fastener 38 connected to tube 22 at first end 24.

Figure 2:
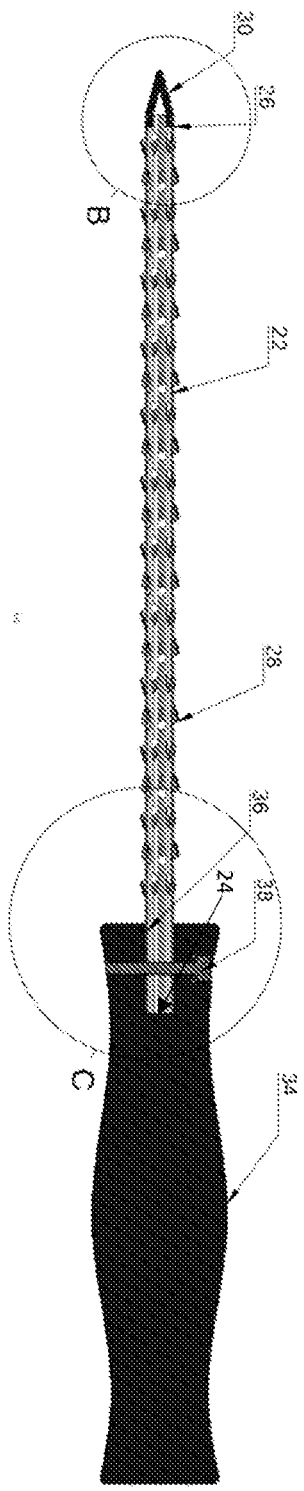
FIG. 2: SECTION VIEW A is a longitudinal cross-sectional view (1:1) of the carving tool of FIG. 1.
Figure 3:
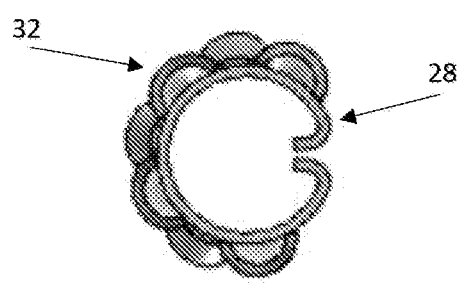
FIG. 3 is a birds-eye view closeup (2:1) of the hollow tube carving surface showing multi-directional carving element design.
Figure 3A:
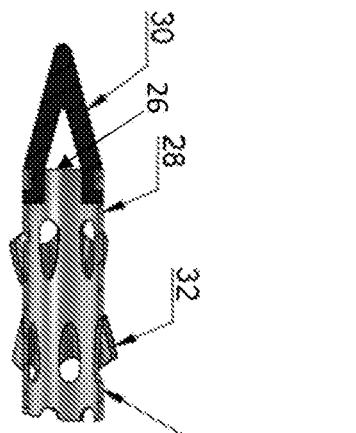
FIG. 3A: DETAIL B is a longitudinal cross-sectional view closeup (2:1) of the tip and adjoining tube showing multi-directional carving elements present around the circumference of the tube from FIG. 2.
Figure 3B:
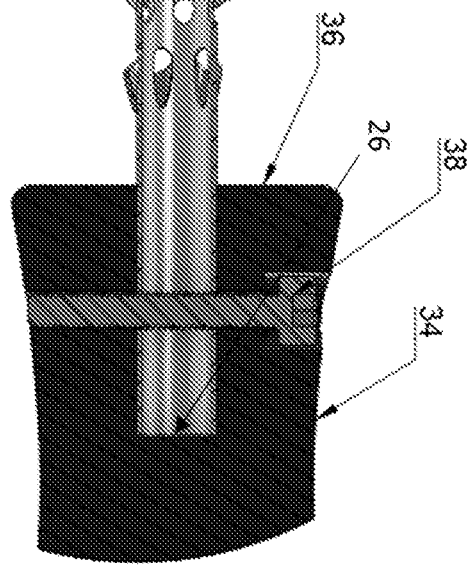
FIG. 3B: DETAIL C is a longitudinal cross-sectional view closeup (2:1) of the tube as it connects to the handle element such that it continues into the handle to present a securely affixed and rigid complete structure from FIG. 2. A fastener is used to affix the tube to the handle to alleviate both rotation and translation of the shaft while the tool is in use. The fastener can be removed allowing all components to more easily be cleaned.
Figure 4:
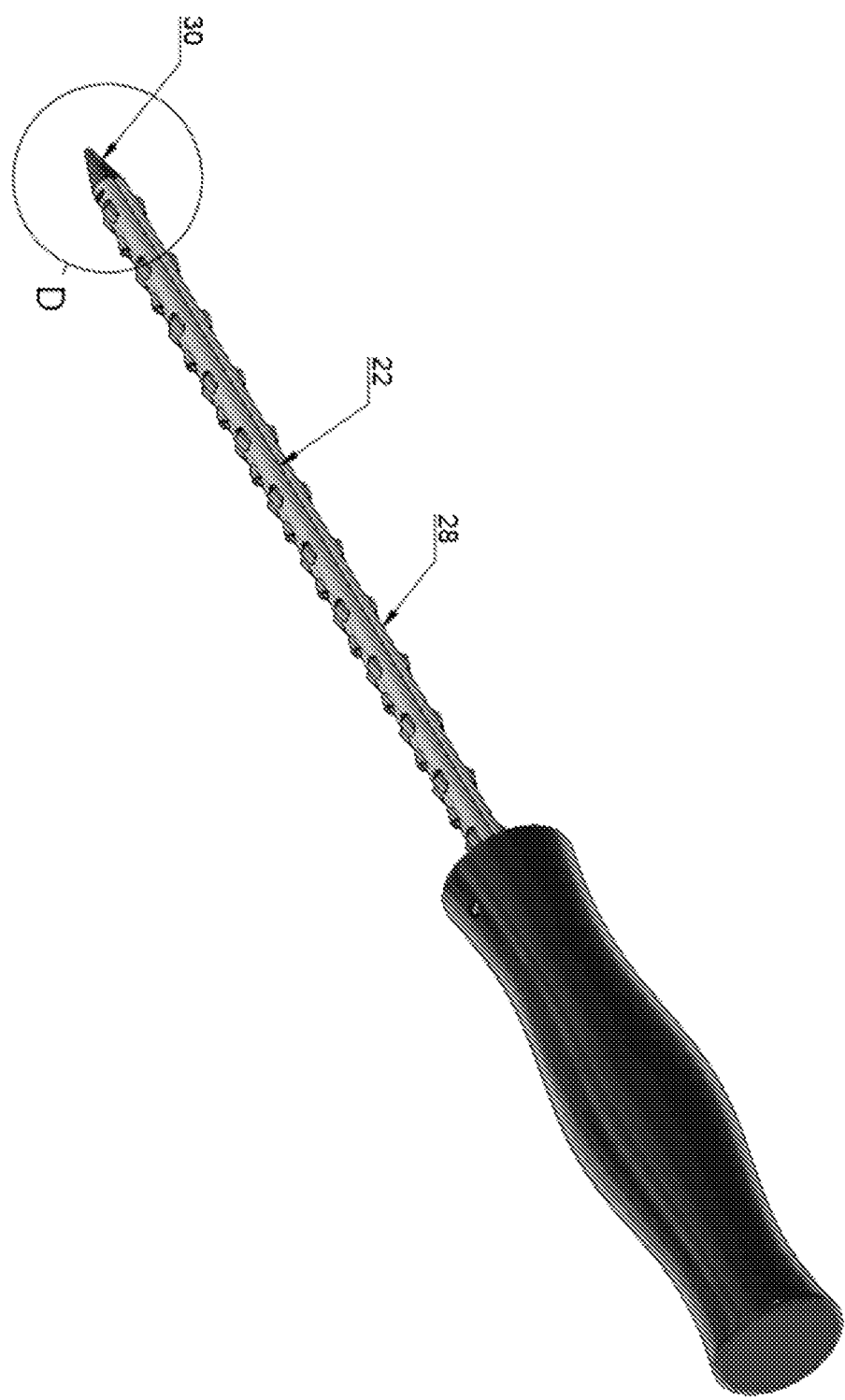
FIG. 4: ENTIRE TOOL is an isometric view of the preferred embodiment of the carving tool of the present invention.
Figure 5:
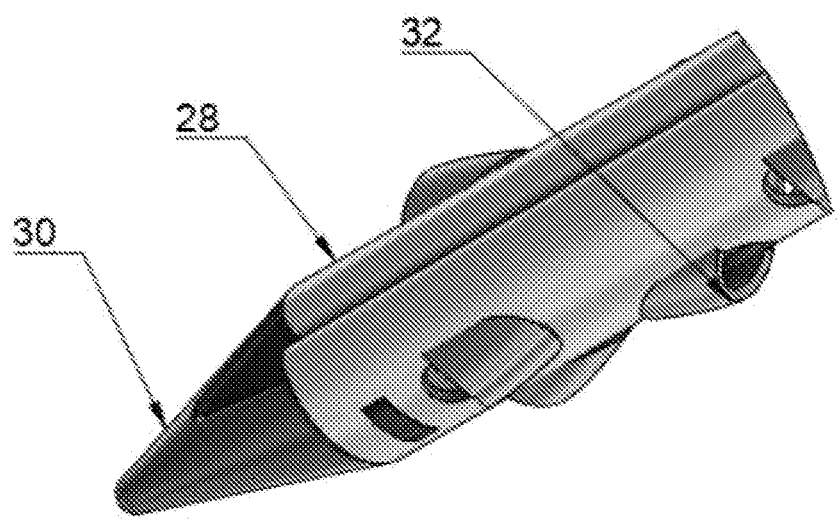
FIG. 5: DETAIL D is an isometric view closeup (4:1) of the tip and adjoining tube showing multi-directional carving elements present around the circumference of the tube from FIG. 4.

Hollow tube 22 is preferably made of steel, but can alternatively be made of aluminum, another metal, plastic, or other material. Hollow tube 22 in other embodiments can be ovular, crescent, square, rectangular, triangular, or other formed hollow shape. Handle 34 is preferably made of plastic but can also be made of wood, foam, or other material. Preferably, first end 24 of hollow tube 22 has a tang portion 36 and handle 34 connects to the outer surfaces of tang portion 36, as shown in cross-section in FIG. 2. Tang portion 36 can extend through the entire length of handle 34 or only partially, as shown in FIG. 2. Handle 34 connects to hollow tube 22 through the use of fastener 38 to tang portion 36. Fastener 38 is preferably a set screw but can also be through the use of bolts, adhesives, welds, press fit, or other means. Alternatively, handle 34 can be formed integrally with hollow tube 22 as by, for example, injection molding, other type of molding, or forging.

In another embodiment, hollow tube 22 has external threads at first end 24 which mate with internal threads in an aperture in handle 34 to connect hollow tube 22 to handle 34. First end 24 can also connect to handle 34 by interference fit into an aperture in handle 34.

Conical tip 30 of hollow tube 22 preferably is a separate form that affixes to second end 26 but can also be formed integrally with hollow tube 22. In the preferred embodiment, conical tip 30 is rounded or blunt, but conical tip 30 can also have a sharp point.

The plurality of carving element 32 are multi-directional carving elements. In the preferred embodiment, each carving element 32 comprises a cutout with sharpened cutting edges leading to an opening. In other embodiments, cutouts 32 are polygonal, other shapes and patterns, or are grating or filing type elements.

Each cutout 32 has a perimeter with a sharpened edge. Preferably, only a portion is sharpened and sharpened portions are oriented in multi-directional fashion, but each cutout can be sharpened throughout the entire perimeter if desired. Preferably, every cutout has sharpened edges, but fewer than all cutouts can have sharpened edges if desired.

While preferred embodiments of the present invention are shown and described, it is envisioned that those skilled in the art may devise various modifications of the present invention without departing from the spirit and scope of the appended claims.

I claim:

1. A carving tool for pumpkins gourds, fruits, or vegetables, for display or presentation comprising:
   a tube made of plastic or metal having a first end, a second end and a surface;
   a conical tip affixed to the second end, having a base with a diameter substantially equal to a diameter of the second end, and made of plastic or metal;
   a handle connected to the first end; and
   a plurality of carving elements on the surface of the tube between the first end and the second end, wherein each carving element includes a cutout with a sharpened cutting edge on at least a portion of a perimeter of the cutout and a cutting portion with sharpened cutting edges extending outwardly from the perimeter of the cutout and the tube surface for the purpose of grating or filing.

2. The carving tool of claim 1, wherein each cutout has a polygonal shape.

3. The carving tool of claim 1, further comprising a tang connected to the first end of the hollow tube.

4. The carving tool of claim 1, wherein the conical tip is one of blunted or sharp.

* * * * *